US012668477B2

(12) United States Patent
Bradshaw et al.

(10) Patent No.: US 12,668,477 B2
(45) Date of Patent: Jun. 30, 2026

(54) DEVICE FOR FILLING CONTAINERS AND METHOD FOR MONITORING THE FILLING PROCESS

(71) Applicant: KRONES AG, Neutraubling (DE)

(72) Inventors: Ines Bradshaw, Neutraubling (DE); Stefan Poeschl, Neutraubling (DE); Valentin Becher, Neutraubling (DE); Eva Beierle, Neutraubling (DE); Hubert Auer, Neutraubling (DE); Joerg Zacharias, Neutraubling (DE)

(73) Assignee: KRONES AG, Neutraubling (DE)

( * ) Notice: Subject to any disclaimer, the term of this patent is extended or adjusted under 35 U.S.C. 154(b) by 7 days.

(21) Appl. No.: 18/443,181

(22) Filed: Feb. 15, 2024

(65) Prior Publication Data

US 2024/0279042 A1 Aug. 22, 2024

(30) Foreign Application Priority Data

Feb. 16, 2023 (DE) ........................ 10 2023 103 859

(51) Int. Cl.
*B67C 3/28* (2006.01)

(52) U.S. Cl.
CPC .............. *B67C 3/287* (2013.01); *B67C 3/286* (2013.01)

(58) Field of Classification Search
USPC .............................................................. 141/9
See application file for complete search history.

(56) References Cited

U.S. PATENT DOCUMENTS

| | | | | |
|---|---|---|---|---|
| 5,314,703 | A * | 5/1994 | Gibney | B67D 1/0871 426/231 |
| 2003/0060994 | A1* | 3/2003 | Deng | A47J 31/402 702/105 |
| 2007/0228075 | A1* | 10/2007 | Edwards | B67D 1/0888 222/129.1 |
| 2010/0127015 | A1* | 5/2010 | Boyer | B67D 1/0036 700/285 |
| 2018/0334373 | A1 | 11/2018 | Knieling | |
| 2019/0100422 | A1 | 4/2019 | Muszinski et al. | |

(Continued)

FOREIGN PATENT DOCUMENTS

| | | |
|---|---|---|
| DE | 2226465 | 12/1973 |
| DE | 10 2005 035 264 A | 2/2007 |

(Continued)

OTHER PUBLICATIONS

Search Report Issued on Nov. 28, 2023 by the German Patent Office in priority application No. DE 10 2023 103 859.1, 7 pages.

(Continued)

*Primary Examiner* — Christopher M Afful
(74) *Attorney, Agent, or Firm* — Haynes and Boone, LLP

(57) ABSTRACT

Device for filling a container with a filling product, for example in a beverage filling system, and method for monitoring a filling process, wherein the device comprises: at least one filling member with a product chamber for receiving the filling product and introducing the filling product via an outlet into the container to be filled; and a measuring portion with a least one spectral sensor which is configured to determine one or more properties of the filling product on the basis of a spectroscopic measuring principle.

17 Claims, 1 Drawing Sheet

(56) References Cited

U.S. PATENT DOCUMENTS

| | | | | |
|---|---|---|---|---|
| 2019/0277757 | A1* | 9/2019 | Frielinghaus | B01F 35/213 |
| 2020/0016550 | A1* | 1/2020 | Engel | A23L 2/52 |
| 2021/0009403 | A1* | 1/2021 | Becher | B67D 7/0294 |
| 2022/0169488 | A1 | 6/2022 | Becher | |
| 2022/0378060 | A1* | 12/2022 | Rueter | A23F 3/18 |

FOREIGN PATENT DOCUMENTS

| | | |
|---|---|---|
| DE | 10 2007 058 047 | 6/2009 |
| DE | 10 2009 049 583 | 5/2011 |
| DE | 10 2016 105 524 | 9/2017 |
| DE | 10 2016 121 780 A | 5/2018 |
| DE | 10 2018 216 138 A | 3/2020 |
| DE | 10 2019 118 937 | 1/2021 |
| EP | 0 775 668 | 5/1997 |
| EP | 2 272 790 | 1/2011 |
| EP | 3834954 | 6/2021 |
| WO | 20090114121 | 9/2009 |
| WO | WO 2022/263132 | 12/2022 |

OTHER PUBLICATIONS

Extended European Search Report dated Jul. 9, 2024, from European Application No. 24158031.5, 14 pages.

* cited by examiner

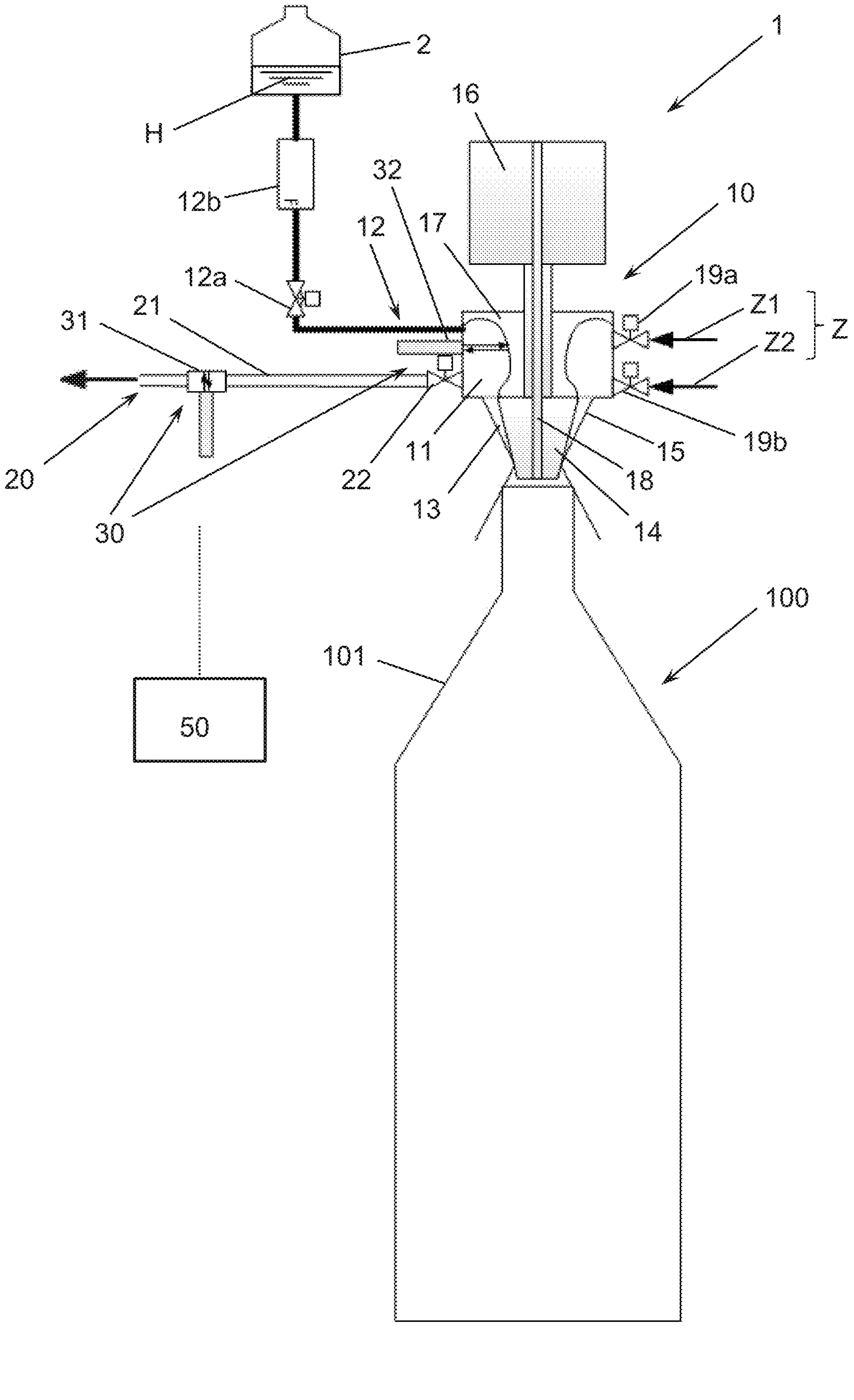
1
2
H
16
12b
32
17
12
10
12a
19a
Z1
Z
Z2
31
21
20
22
11
15
19b
18
13
14
30
100
101
50

DEVICE FOR FILLING CONTAINERS AND METHOD FOR MONITORING THE FILLING PROCESS

CROSS-REFERENCE TO RELATED APPLICATIONS

This application claims priority from German Patent Application No. DE 10 2023 103 859.1, filed on Feb. 16, 2023 in the German Patent and Trademark Office, the disclosure of which is incorporated herein by reference in its entirety.

BACKGROUND

Technical Field

The present invention relates to a device for filling a container with a filling product, for example in a beverage filling system, and a method for monitoring a process for filling a container with a filling product.

Related Art

In order to mix and fill filling products which consist of a plurality of components, a technology is known for dosing the individual components in which the components are first combined at least partially in the container and/or in a common filling valve, see for example EP 0 775 668 A1 and WO 2009/114121 A1. The dosing of a component to be added to a base fluid is carried out upstream of the filling valve outlet, wherein the desired quantity can be measured, for example, by measuring the volume by means of a flow meter (EP 0 775 668 A1) or by a different volume dosing technology (WO 2009/114121 A1), namely by means of a dosing piston and/or a diaphragm pump.

A development of the dosing/filling process in which the components are mixed at a late point in time, i.e. either during or shortly before filling, is disclosed in EP 2 272 790 A1 and DE 10 2009 049 583 A1. The components of the filling product are dosed directly during the filling process by means of a flow meter and introduced together into the container to be filled, wherein during the dosing process a main component is displaced to the rear by the dosed component. The displaced volume of the main component is determined by means of the flow meter, and thus the volume of the dosed component is also known and controllable. When the filling product is subsequently filled into the container, the main component together with the dosed component is flushed completely out of the filling valve into the container, wherein at the same time the total filling quantity can be determined by the same flow meter. In the next filling cycle, the filling quantities and also the quantities of the dosed component can be determined again. Thus a highly flexible filling of customized beverages is possible without changeover times.

Due to the construction of the flexible filling valve and the blending of the components associated therewith in the filling valve and/or in the container, product monitoring (syrup content, flavourings, etc.) can often be carried out only when the product has been completely filled. The quality control is carried out, for example, manually by the random sampling of individual containers and subsequent analysis in the laboratory. In the case of transparent containers, the quality of the product can be evaluated via imaging methods when the container is completely filled, wherein a differentiation based on a colour evaluation is not possible with transparent products, however.

According to a further type of filling machine, the blending of the filling product takes place in a mixer, wherein generally a base substance and/or a syrup is mixed into a product water stream. The filling product thus produced is received in a product tank and mixed further therein before it is fed to a filler vessel which supplies a plurality of filling valves for introducing the filling product into corresponding containers. The technological separation between the mixer and filler and the use of individual tanks results in a thorough mixing of the filling product. The drawbacks here, however, are that the entire system is complex in terms of engineering—this also relates to the communication between the mixer and the filler—and is costly to maintain. During a product changeover, the buffer tank of the mixer and the filling machine have to be cleaned, whereby the product changeover is time-consuming.

In such filling systems which fill the fully blended product, the primary regulation of the mixing ratio and any carbonation is carried out by flow meters in all of the inlet flows (deaerated water, ready-made syrup, $CO_2$, etc). At the end of the mixer, the product is additionally monitored as far as possible inline, for example by means of Brix measurement, $CO_2$ monitoring and the like, see for example DE 10 2007 058 047 A1 and DE 10 2016 105 524 A1.

The inline monitoring in the case of filling systems based on a mixer has, however, certain limits, for example when evaluating the residual water in the filler vessel. In the case of the flexible filling valve ("late blending"), the product control is made more difficult by the product being first fully mixed in the container. The late blending of the product in the filling valve and/or container results in the product monitoring not being carried out continually inline in the product inlet to the filler, but only being able to take place on the blended product in the container.

With the technology of the flexible filling valve, only the individual product components can be separately monitored inline in the inlets, i.e. for example the syrup in the syrup line and the $CO_2$ content of the carbonated water in the water line. The quantity of the two components to be dosed is determined by the same flow meter in the filling valve. A malfunction of the flow meter can only be discovered by monitoring the filling level in the filled container. If the malfunction occurs only during the dosing process, the fault is almost impossible to discover. A second possible malfunction in the flexible filling process relates to the potentially incomplete flushing of the valve, so that dosed product from previous fillings remains in the valve. A third possible malfunction relates to the leakage of a dosing valve into the filling valve. In this case, a minimum residue of the incorrect product can also be present in the filling valve.

The above-mentioned malfunctions which can have a negative effect on the product quality are currently difficult to identify. A random monitoring of individual containers in the laboratory is time-consuming and costly in terms of resources, is carried out with a delay and does not provide continuous online monitoring. In particular, the risk of product carry-over is not sufficiently monitored or determined in the case of frequent product changeover, for which the flexible filling process is suitable.

SUMMARY

An improved device for filling a container with a filling product, for example in a beverage filling system, and an improved method for monitoring a process for filling a container with a filling product is described herein according to various embodiments.

The device is configured for filling a container with a filling product. The device is for example used in a beverage filling system, for example for filling water (still or carbonated), soft drinks, smoothies, juices, beer, wine, dairy products, mixed beverages and the like.

The filling product in several embodiments comprises at least two product components which are also denoted herein as the "main component" and "additional component(s)", wherein no order, sequence or prioritization is specified by this terminology. The main component is in one embodiment water (carbonated or still) and the one or more additional components comprise, for example, syrup, flavours, pulp, small pieces of fruit, cereals, $CO_2$, carbonated water and the like.

The device comprises at least one filling member with a product chamber for receiving the filling product and introducing the filling product via an outlet into the container to be filled, and a measuring portion with at least one spectral sensor which is configured to determine one or more properties of the filling product on the basis of a spectroscopic measuring principle.

The measurement by the at least one spectral sensor takes place inside the device, in some embodiments in the product chamber, i.e. before introducing the filling product into the container. More specifically, the measurement takes place on the filling product which has not been introduced into the container, since the filling product can optionally be circulated via a recirculation line or is discharged/disposed of via a drainage line (both commonly denoted herein as the "discharge") and in this case the filling product which is present in the filling member does not necessarily pass into the container.

In one or more embodiments, the measuring portion is configured to determine relative to the property (properties) to be determined a Brix content and/or a $CO_2$ content and/or the density and/or a composition (flavourings, caffeine, etc.) and/or a mixing ratio of the filling product.

The sensor system which is integrated in the device, in certain embodiments in the filling member, on the basis of a spectral measurement permits the verification of product differences, namely the detection of the smallest quantities of flavourings from previous filling products, and any leakages. The measuring principle permits inline and online monitoring at the latest possible measuring time, namely directly in the filling member or in the region of the filling member, and thus determines the product quality as it is to be ultimately found in the container. Incorrect dosing, flavour carry-over and any leakages can be identified and the containers affected thereby can be treated individually, for example remedied or ejected. In this manner, a full quality control of each individual container is possible. A subsequent potentially random monitoring of the filled containers can be dispensed with or at least reduced in terms of effort/scope.

Since the measuring portion is integrated in the device, the quality control is carried out irrespective of the type of container. It is equally applicable to PET and glass bottles, cans, paper containers and all other types of container, since the quality control is carried out before the filling and thus without being influenced by the container.

In principle, the measuring portion can contribute to the process control but in many embodiments is not incorporated in the process control, whereby the measuring portion is solely responsible for the quality control.

In several embodiments, the measuring portion has a spectral sensor on the product chamber side which is installed in the product chamber and which is configured to detect one or more properties of the filling product in the product chamber on the basis of a spectroscopic measuring principle. The product chamber of the filling member is particularly suitable as a measuring point since a change in the filling product over time can be observed therein before or during the filling process and thus the quality control can be carried out at the latest possible measuring time.

Alternatively or additionally, the at least one spectral sensor can be installed in a discharge portion. The discharge portion permits a discharge of the filling product or the liquid present in the filling member by bypassing the container. The discharge portion can be configured, for example, for a recirculation of the filling product and/or a disposal of the filling product. Such a spectral sensor on the discharge side can also be used for measuring the filling product.

In various embodiments, the at least one spectral sensor has a transmitter and a receiver which are configured such that a measuring beam, for example light, emitted by the transmitter passes through at least a part of the filling product to be measured, is received from the transmitter and can be analysed spectroscopically. According to an uninterrupted transmitted light structure, the transmitter and receiver can oppose one another such that the measuring beam passes through a viewing path without changing direction. Alternatively, the measuring beam can be reflected on the path from the transmitter to the receiver by at least one reflective surface (mirror, stainless steel surface, etc.), whereby the measuring device can be configured to be more compact in terms of engineering and simpler to assemble.

In one or more embodiments, the device has a controller which is in communication with the at least one spectral sensor and is configured to carry out by using the at least one spectral sensor a measurement of the difference between a pure or clean base liquid, for example water, and a base liquid, for example water, in or out of the filling member, in particular the product chamber of the filling member. The clean or pure base liquid, which in one embodiment does not pass through the filling member, functions here as a reference liquid. In this manner, for example, it is possible to determine any leakage in the filling member and the tendency of the filling member to flavour carry-over. To this end, the controller is in certain embodiments configured to measure by using the at least one spectral sensor an absorption of the measuring beam in a viewing path through which the two liquids flow alternately.

The above-mentioned control device in some embodiments also serves for controlling/regulating the actual filling process, wherein the two tasks—filling process control and quality control—can also be carried out and monitored separately by separate devices.

The communication between the controller and the components to be activated and/or read can be implemented in a wired or wireless, digital or analogue manner. The communication does not necessarily have to comprise an information exchange in both directions. A unidirectional data or signal flow falls under the term "communication". The controller does not necessarily have to be formed by a central computing device or electronic control system, but it comprises decentralized and/or multi-stage systems, control networks, cloud systems and the like. The controller can also be an integral component of a higher-level system controller or communicate therewith.

In several embodiments, the filling member has a main inlet which is configured to introduce the filling product or a main component of the filling product, for example water, into the product chamber of the filling member. The main inlet in one embodiment comprises a main valve and is connected, for example, to a filler vessel or another suitable source for the filling product, or the main component thereof in the case of a multi-component filling product.

In one or more embodiments, the filling member has one or more, for example two, dosing valves which are configured to introduce corresponding additional components, for example comprising syrup and/or $CO_2$, into the product chamber. In this manner, a multi-component filling product can be fully or partially produced, and the quality thereof tested, directly in the product chamber.

In the case of a multi-component filling product, the components thereof at least partially being combined in the product chamber, the filling process can take place in series or parallel. In the case of series filling, firstly the dosing of the additional component(s) into the product chamber is carried out when the filling member is closed, whereby only a short mixing phase is carried out in the product chamber. Then the filling member is opened. In the case of parallel filling, the dosing of the additional component(s) into the product chamber is carried out when the filling member is open. Here the product is at least partially blended in the product chamber.

A spectral sensor on the product chamber side can be used for both filling processes, even when the concentration in the product chamber is a variable mixed value. In the case of series dosing, in particular, a possible time difference between the phases can be detected, and in the case of parallel dosing alternatively or additionally the mixing ratio. The properties of the product detected by the spectral sensor on the product chamber side can be compared with a reference which can be calibrated if required.

In many embodiments, a flow meter is installed in the main inlet. In this case, the controller is in some embodiments configured to introduce the main component into the product chamber, then to introduce at least one additional component through the at least one dosing valve into the product chamber, and for dosing the additional component to determine the quantity of fluid passing in the main inlet, i.e. displaced to the rear, by using the flow meter. Then the filling product contents in the product chamber can be introduced into the container.

The measuring portion is not only able to be used for the quality control of the filling product thus mixed, but can deliver an indication of any malfunction of the flow meter, for example when detecting unusual mixing ratios which contradict the measured fluid quantity displaced to the rear.

In several embodiments, the product chamber is of annular configuration and tapers in the lower region to form an annular outlet, so that the filling product is swirled when introduced into the container. The product chamber is thus in various embodiments configured as an annular channel or torus. In order to assist the generation of swirl, the main inlet in one embodiment leads tangentially into the product chamber.

The filling product is swirled by the annular product chamber and the tapering outlet, assisted by the in some embodiments tangential supply of the filling product from the main inlet into the product chamber, whereby the filling product is forced outwardly by centrifugal force and after exiting from the filling member flows downwardly on the container wall of the container placed below the outlet. The tapering or the constriction of the product chamber toward the outlet firstly leads to a uniform and well-defined swirl across the periphery and secondly is a significant determining factor for the flow rate.

The opening/blocking of the filling member can be implemented by means of a valve cone which has a cylindrical shape which tapers toward the outlet and which can be adjusted by means of an actuator in the axial direction, wherein the actuator is configured to adjust the valve cone between an open position and a closed position, in certain embodiments steplessly. Alternatively, a different suitable valve can be installed in order to open, close and optionally regulate the flow rate of the filling product from the product chamber into the container.

A method for monitoring a process for filling a container with a filling product, for example in a beverage filling system, comprises: introducing a liquid, for example the filling product, into a product chamber of a filling member which is provided for introducing the filling product into the container to be filled; determining one or more properties of the liquid, for example a Brix content and/or a $CO_2$ content and/or the density and/or a mixing ratio by using at least one spectral sensor of a measuring portion on the basis of a spectroscopic measuring principle.

The features, technical effects, advantages and exemplary embodiments which have been described relative to the device also apply to the method.

Thus for the above-mentioned reasons, a measurement of the difference between a pure base liquid, for example water, and a base liquid, for example water, is carried out in or out of the filling member, in some embodiments by using the at least one spectral sensor, wherein in various embodiments by using the at least one spectral sensor an absorption of the measuring beam is measured in a viewing path through which both liquids flow alternately.

In one or more embodiments, the filling product is a multi-component filling product comprising a main component, for example water, and at least one additional component, for example syrup and/or $CO_2$, wherein the main component is introduced from a main inlet into the product chamber, the at least one additional component is introduced via a corresponding dosing valve into the product chamber, and by using the at least one spectral sensor a mixing ratio is determined between the main component and the at least one additional component. The mixing ratio can be directly measured or derived from one or more other variables, for example the Brix content.

In one or more embodiments, a flow meter is installed in the main inlet, wherein initially the main component is introduced into the product chamber, then the at least one additional component is introduced via the corresponding dosing valve into the product chamber, and for the dosing of the at least one additional component the quantity of fluid which passes in the main inlet, i.e. displaced to the rear, is determined or detected by using the flow meter. As set forth above, the measuring portion is able to be used not only for the quality control of the filling product thus mixed but it can also provide an indication of any malfunction of the flow meter.

Further advantages and features of the present invention can be found in the following description of exemplary embodiments. The features described therein can be implemented individually or in combination with one or more of the features set forth above, provided the features do not contradict one another. The following description of exemplary embodiments is made relative to the accompanying drawing.

BRIEF DESCRIPTION OF THE FIGURES

Further embodiments of the invention are explained in more detail by the following description of FIG. 1, which shows schematically a device 1 for filling a container 100 with a filling product.

DETAILED DESCRIPTION

Exemplary embodiments are described hereinafter by way of FIG. 1, which shows schematically a device 1 for filling a container 100 with a filling product.

The device 1 is in some embodiments used in a beverage filling system, for example for filling water (still or carbonated), beer, juice, soft drinks, smoothies, dairy products and the like. The device 1 is in an exemplary embodiment implemented in a carousel design in which the containers 100 to be filled are supplied to a filler carousel and during transport are filled with the filling product along a pitch circle.

The device 1 is in one embodiment configured to fill the container 100 with a multi-component filling product. In this case, the filling product comprises at least two product components which are also denoted herein as the main component H and the additional component Z. The main component H is in certain embodiments water and the additional component Z can be, for example, syrup. In various embodiments, the filling product can be soft drinks. However, there is no restriction in this regard. For example, the main and additional component H, Z can be milk of variable fat content, in order to be able to set a desired fat content in a flexible manner in the filled product. Alternatively, it is possible to fill juices with pieces of fruit, wherein pulp is mixed as an additional component Z with a juice main component H. The additional component Z can comprise additives, flavourings, carbonated water, etc. Applications outside the beverage or food industry are also possible, for example in the care sector, for filling shampoo and the like.

In the exemplary embodiment of FIG. 1, the device 1 is configured to mix and to introduce into the container 100, in addition to the main component H, two additional components, namely a first additional component Z1 and a second additional component Z2.

The device 1 is suitable for a rapid, flexible product changeover, in particular when the various filling products are based on a common carrying medium—the main component H—and various additives—the additional components Z, Z1, Z2.

The device 1 has a filling member 10 which according to the exemplary embodiment of FIG. 1 is able to swirl the filling product when introduced into the container 100. To this end, the filling member 10 has a product chamber 11 which is configured as an annular channel or torus. The filling member 10 also has a main inlet 12 which in several embodiments leads tangentially or substantially tangentially into the product chamber 11. The main inlet 12 comprises a main valve 12*a*, a flow meter 12*b* and is connected to a filler vessel 2 which provides the main component H.

In the lower region of the filling member 10, the product chamber 11 tapers to form an annular outlet 13 from which the filling product exits during the filling process and runs into the container 100 placed below the filling member 10.

It should be mentioned that spatial references, such as for example "under" "below", "over", "above", etc. refer to the usual installation position of the filling member 10 which is clearly determined by the direction of gravity. Moreover, due to the annular outlet 13 the filling member 10 has a defined axial direction which in the installed state at least substantially coincides with the direction of gravity.

The filling product is swirled by the annular product chamber 11 and the tapering outlet 13, assisted by the in one embodiment tangential supply of the filling product from the main inlet 12 into the product chamber 11, whereby this filling product is forced outwardly due to centrifugal force and after exiting from the filling member 10 flows downwardly on the container wall 101. The tapering or constriction of the product chamber 11 toward the outlet 13 leads, on the one hand, to a uniform and well-defined swirl across the periphery.

According to the exemplary embodiment of FIG. 1, the filling member 10 has a valve cone 14 which has a cylindrical shape tapering toward the outlet 13. The annular gap adjoining the product chamber 11 is formed on the inside at least in some portions by the outer peripheral surface of the valve cone 14. On the outside the annular gap is defined or formed by a valve housing 15. The valve cone 14 is configured to be displaceable in the axial direction, i.e. upwardly and downwardly. In this manner, the annular gap can be increased and reduced at the outlet 13. The height of the valve cone 14 is adjusted within the working range, i.e. in some embodiments steplessly between a fully open position and a closed position, actuated by means of a suitable actuator 16. If a valve seat is formed by the internal shape of the valve housing 15, the valve seat being sealingly in contact with the valve cone 14 in the closed position of the filling member 10, the outlet 13 can be fully closed, whereby a blocking function can be implemented.

Alternatively, a different suitable valve can be installed in order to open, close and optionally regulate the flow of filling product from the product chamber 11 into the container 100.

The lateral main inlet 12, i.e. leading tangentially into the product chamber 11, provides space above the product chamber 11. The space is not occupied and can be used for the assembly of a diaphragm 17 which seals the product chamber 11 in the upper region. The diaphragm 17 has a circular outer contour which is connected directly or indirectly to the valve housing 15. The diaphragm 17 is also fastened radially inwardly to the valve cone 14. The diaphragm 17 is produced from a flexible material, for example Teflon, whereby it can follow the axial movement of the valve cone 14 and at the same time ensures a hygienic seal of the product chamber 11. The symmetry of the diaphragm 17 also permits an embodiment with a high number of stress cycles as is generally required for filling valves.

The filling member 10 in some embodiments has a gas channel 18 which passes centrally through the valve cone 14 in the axial direction. The gas channel 18, for example, is a return gas channel in order to discharge any gas, such as pressurized gas, which is displaced from the container 100 during the filling process. The gas channel 18, however, can also have a multi-channel construction, for example a tube-in-tube construction, in order to provide separate supply and discharge gas paths.

The valve cone 14 terminates substantially directly below a throttle point, i.e. the narrowest point of the annular gap forming the outlet 13, whereby a defined change is implemented from a single-phase gap flow to a wall film flow in the container 100. Thus a well-defined uniform separation edge of the liquid is formed and namely at the point with the highest flow rate. In several embodiments, the valve seat, i.e.

the blocking point, is located in the immediate vicinity of the separation edge, whereby the surfaces which could result in dripping are minimized.

The filling member 10 is particularly suitable for the wall filling set forth above, in which the filling product runs spirally downwardly on the container inner wall 101. However, the filling member 10 can also be constructed as a free flow valve. The filling member permits a full flushing of the valve interior, in particular the product chamber 11 and the outlet 13 which is adjacent thereto in the filling direction with a minimal flushing quantity, due to the high turbulence which can be achieved in the product chamber 11 and a relatively small surface area. For this reason, the filling member 10 is particularly suitable for a frequent changeover, for example including the containers, of the filling product, in particular additional components Z, Z1, Z2 to be dosed. Due to the excellent flushability, the filling member 10 can also be used in aseptic filling machines.

The compact design of the filling member 10 also permits a hygienic integration of the valve cone drive or actuator 16, and optionally further control functions in the valve head, i.e. above the product chamber 11, for example an integration of gas valves for pretensioning the container 100, return gas lines, pressure relief lines, solenoid valves for further separate control functions in the region of the filling member 10, such as lifting and lowering the valves, dosing components, etc. In addition, for example, a control board can be installed for implementing decentralized control architectures in the valve head.

In order to implement a rapid product changeover, substantially without changeover time, the filling member 10 has one or more, for example two, dosing valves 19*a*, 19*b* which are installed in corresponding supply lines for the additional components Z, Z1, Z2 leading into the product chamber 11. The additional components Z, Z1, Z2 can be dosed in the desired quantity into the product chamber 11 via the dosing valves 19*a*, 19*b*.

The mixing of the additional components Z, Z1, Z2 is carried out directly in the product chamber 11 by the dosing valves 19*a*, 19*b*, whereby a good flushability of the filling member 10 is ensured and any flavour carry-over is minimized. Due to the integration of the supply of additional components Z, Z1, Z2 in the valve housing 15, no hoses or additional lines are required. In this manner, the filling member 10 is suitable for an immediate product changeover.

The main inlet 12 comprising the flow meter 12*b*, in combination with the dosing valves 19*a*, 19*b*, permits dosing by rearward displacement. The filling product is directly mixed together from a plurality of components—the main component H and the additional components Z, Z1, Z2—in the product chamber 11 of the filling member 10, wherein the additional components Z, Z1, Z2 are introduced via the dosing valves 19*a*, 19*b* into the product chamber 11. The main component H previously supplied through the main supply 12 is displaced to the rear by the introduction of the additional components Z, Z1, Z2 into the product chamber 11. The displaced volume of the main component H is determined by means of the flow meter 12*b*, and thus the volume of the dosed additional component(s) Z, Z1, Z2 is also known and controllable. When the filling product is subsequently filled into the container 100, the main component H together with the dosed additional components Z, Z1, Z2 are flushed completely out of the filling member 10 into the container 100, wherein at the same time the total filling quantity can be determined by the same flow meter 12*b*. In the next filling cycle, the filling quantities and also the quantities of the dosed component can be determined again. Thus a highly flexible filling of customized filling products, in particular beverages, is possible substantially without changeover times.

Optionally a discharge portion 20 is connected to the filling member 10, the liquid located in the product chamber 11 being discharged thereby, in particular returned to the filler vessel 2, and/or being able to be removed/disposed from the system. The discharge portion 20 comprises a discharge 21 and a discharge valve 22 which connects the discharge 21 to the product chamber 11 in a blockable manner.

The device 1 also has an integrated measuring portion 30 which is integrated, in particular, in the filling member 10 and/or in the discharge portion 20 and which is configured to detect on the basis of a spectroscopic measuring principle properties of the filling product, for example the Brix content, $CO_2$ content, density, mixing ratio, etc. To this end, the measuring portion 30 has one or more spectral sensors 31, 32 which function individually or in cooperation with a corresponding electronic device or controller 50 as a spectrometer.

In some embodiments, the measuring portion 30 is configured to determine a mixing ratio between the main component H and the one or more additional components Z, Z1, Z2.

In various embodiments, the discharge portion 20 and the product chamber 11 of the filling member 10 are considered as installation locations for the spectral sensors 31, 32. In the exemplary embodiment of FIG. 1, both a spectral sensor 31 on the discharge side and a spectral sensor 32 on the product chamber side are installed. However, a single spectral sensor 31, 32 for each filling member 10 is sufficient for most applications.

The spectral sensor 31 on the discharge side can be installed in the discharge 21 between the filling member 10 and the filler vessel 2. The discharge valve 22, in several embodiments configured as a changeover valve, and possibly a pump (not shown in FIG. 1) are installed to this end. In one or more embodiments, a plurality of changeover valves are provided for each filling member 10. The spectral sensor 31 on the discharge side can either be installed in the discharge 21 directly downstream of the filling member 10 or in a central collection line which is connected to all, or at least a plurality of, filling members 10. It is advantageous if the discharge 21 is configured as a drainage line which does not lead back to the filler vessel 2, and the spectral sensor 31 on the discharge side is inserted in the drainage line. In this case, the hygiene requirements for the spectral sensor 31 on the discharge side are lower since the liquid removed via the drainage line is removed from the production process.

The spectral sensor 32 on the product chamber side can be installed as an alternative or additional spectral sensor directly in the product chamber 11 of the filling member 10.

The above-mentioned spectral sensors 31, 32 can have a transmitted light structure with a transmitter and receiver so that the measuring beam emitted by the transmitter passes through at least one part of the product to be measured and can be received from the transmitter and analysed spectroscopically. The measuring beam is in one embodiment light, wherein wavelengths outside the visible spectrum can be encompassed. Reflective solutions are also possible here, namely by using mirrors or a sensor system based on the reflection of stainless steel surfaces with an inlet and outlet point, by using sapphire windows, for example.

The signal path of the spectral sensor 32 on the product chamber side can be used during the dosing process for the monitoring thereof. An increase in the signal, when the filling member 10 has been flushed after a filling process, is an indication of a leakage.

Alternatively, it is also possible to implement a density measurement which, in particular, is relevant for sugar-containing filling products.

A controller 50 which is in communication with the actuator 16 of the valve cone 14, the valves 12*a*, 19*a*, 19*b*, 22, the sensors 31, 32, the flow meter 12, etc. is provided for activating the filling member 10, the discharge portion 20, the measuring portion 30, etc. and is configured to control or regulate the filling process and the product monitoring.

The communication between the controller 50 and the components to be activated and/or read can be implemented in a wired or wireless, digital or analogue manner. The communication does not necessarily have to comprise an information exchange in both directions. A unidirectional data and/or signal flow falls under the term "communication". The controller 50 does not necessarily have to be formed by a central computing device or electronic control system, but it comprises decentralized and/or multi-stage systems, control networks, cloud systems and the like. The controller 50 can also be an integral component of a higher-level system controller or communicate therewith.

According to an exemplary embodiment, which targets the monitoring of an undesired leakage in the filling member 10, the controller 50 is configured to carry out a measurement of the difference between a pure or clean base liquid and the base liquid in or out of the filling member 10, in particular the product chamber 11. The base liquid can be the filling product itself or a component thereof, in particular the main component H. In one or more embodiments, the base liquid is water. The clean or pure base liquid, which in various embodiments does not pass through the filling member 10, functions here as a reference liquid. In this manner, for example, it is possible to determine any leakage in the filling member 10 and the tendency of the filling member 10 to flavour carry-over.

The difference measurement can be carried out, for example, daily or with each flushing process for cleaning/preparing the filling member 10. The absorption is measured in one or more suitable wavelengths in a viewing path through which both liquids flow alternately. Even minimal carry-over can be verified from the difference, including the ppm or ppb range.

The spectral measurement by means of an integrated sensor system, set forth above, permits the inline verification of deviations in dosages, even for small concentrations, and the detection of the smallest quantities of flavourings from previous products. Without the verification thereof, the flavourings carried-over from an earlier filling process would be flushed out later from the filling member 10 and thus could inadvertently pass into a different product and impair the quality thereof.

The measuring principle permits an inline monitoring at the latest possible measuring time, namely directly in the filling member 10 or in the discharge portion 20, and thus guarantees the desired product quality which is ultimately to be found in the container 100. Incorrect dosages, flavour carry-over and potential leakages can be identified and the containers 100 affected thereby can be ejected accordingly. A hundred-percent quality control of each individual container 100 is possible in this manner.

Since the measuring portion 30 is integrated in the device 1, the quality control is carried out irrespective of the type of container. It is equally applicable to PET and glass bottles, cans, paper containers and other types of container. This represents a significant simplification in comparison with random container testing, for example.

In principle, the measuring portion 30 can also be used for the process control, but in some embodiments is not incorporated in the process control, whereby the measuring portion 30 is solely responsible for the quality control.

If applicable, all of the features which are shown in the exemplary embodiments can be combined together and/or exchanged for one another without departing from the scope of the invention.

What is claimed is:

1. A device for filling a container with a filling product, comprising:

a filling member comprising:

a product chamber that is configured to receive the filling product and to introduce the filling product via an outlet into the container, and an inlet that is configured to introduce the filling product or a component of the filling product into the product chamber, wherein the product chamber is of an annular configuration and tapers in a lower region to form an annular outlet so that the filling product can be swirled when introduced into the container, and the inlet leads tangentially into the product chamber;

a measuring portion comprising a spectral sensor that is configured to determine one or more properties of the filling product based on a spectroscopic measuring principle, wherein the spectral sensor is installed in the product chamber, and the filling product comprises a filling product in the product chamber; and a controller configured to control a filling process and communicate with the spectral sensor and is further configured to measure a difference between a first base liquid and a second base liquid in or out of the filling member via the spectral sensor.

2. The device of claim 1, wherein the one or more properties of the filling product comprise a Brix content, a $CO_2$ content, a density, a composition, and/or a mixing ratio of the filling product.

3. The device of claim 1, further comprising a discharge portion having a discharge that is connected to the product chamber and is configured to discharge liquid from the product chamber by bypassing the container.

4. The device of claim 1, wherein the spectral sensor comprises a transmitter and a receiver, wherein the transmitter is configured to transmit a measuring beam emitted from the transmitter through at least a part of the filling product and the receiver is configured to receive the measuring beam from the transmitter.

5. The device of claim 4, wherein the measuring beam is reflected on a path from the transmitter to the receiver from at least one reflective surface.

6. The device of claim 1, wherein the controller is further configured to measure an absorption in a viewing path through which the first base liquid and the second base liquid flow alternately via the spectral sensor.

7. The device of claim 1, wherein the filling member further comprises one or more dosing valves, which are each configured to introduce an additional component into the product chamber.

8. The device of claim 1, further comprising a flow meter, wherein:

the flow meter is installed in the inlet, the controller is further configured to introduce the component into the product chamber, and then to introduce an additional component into the product chamber via a dosing valve, and the controller is further configured to determine a quantity of fluid passing in the inlet via the flow meter for dosing the additional component.

9. The device of claim 1, wherein the filling member further comprises a valve cone having a cylindrical shape that tapers toward the annular outlet and is displaceable via an actuator in an axial direction, and the actuator is configured to adjust the valve cone between an open position and a closed position.

10. The device of claim 1, wherein the container comprises a polyethylene terephthalate (PET) bottle, a glass bottle, a can, or a paper container.

11. A method for monitoring a process for filling a container with a filling product, comprising:

introducing a liquid into a product chamber of a filling member, wherein the product chamber is configured to introduce the filling product into the container and the filling member further comprises an inlet that is configured to introduce the filling product or a component of the filling product into the product chamber, the product chamber is of an annular configuration and tapers in a lower region to form an annular outlet so that the filling product can be swirled when introduced into the container, and the inlet leads tangentially into the product chamber;

determining one or more properties of the liquid based on a spectroscopic measuring principle via a spectral sensor of a measuring portion, wherein the spectral sensor is installed in the product chamber, and the filling product comprises a filling product in the product chamber; and measuring a difference between a first base liquid and a second base liquid in or out of the filling member via the spectral sensor.

12. The method of claim 11, wherein the one or more properties of the liquid comprises a Brix content, a $CO_2$ content, a density, a composition, and/or a mixing ratio of the liquid.

13. The method of claim 11, wherein measuring the difference between the first base liquid and the second base liquid comprises measuring an absorption in a viewing path through which the first base liquid and the second base liquid flow alternately via the spectral sensor.

14. The method of claim 11, wherein the filling product comprises a component and an additional component, and the method further comprises:

introducing the component from the inlet of the filling member into the product chamber;

introducing the additional component via a dosing valve into the product chamber; and determining a mixing ratio between the component and the additional component via the spectral sensor.

15. The method of claim 14, wherein the component comprises water and the additional component comprises a syrup and/or carbon dioxide.

16. The method of claim 11, further comprising:

installing a flow meter in the inlet of the filling member;

introducing a component into the product chamber;

after introducing the component, introducing an additional component via a dosing valve; and determining a quantity of fluid that passes in the inlet via the flow meter for dosing of the additional component.

17. The method of claim 11, wherein the container comprises a polyethylene terephthalate (PET) bottle, a glass bottle, a can, or a paper container.

* * * * *